US010514313B2

United States Patent
Takakura

(10) Patent No.: US 10,514,313 B2
(45) Date of Patent: Dec. 24, 2019

(54) CAPACITANCE TYPE SENSOR INCLUDING DETECTION AND FIXED CAPACITORS

(71) Applicant: HORIBA STEC, Co., Ltd., Kyoto-shi, Kyoto (JP)

(72) Inventor: Hiroshi Takakura, Kyoto (JP)

(73) Assignee: HORIBA STEC, Co., Ltd., Kyoto-shi, Kyoto (JP)

(*) Notice: Subject to any disclaimer, the term of this patent is extended or adjusted under 35 U.S.C. 154(b) by 127 days.

(21) Appl. No.: 15/840,837

(22) Filed: Dec. 13, 2017

(65) Prior Publication Data

US 2018/0164172 A1  Jun. 14, 2018

(30) Foreign Application Priority Data

Dec. 14, 2016  (JP) .................................. 2016-242282

(51) Int. Cl.
*G01L 9/12* (2006.01)
*G01L 9/00* (2006.01)

(52) U.S. Cl.
CPC .............. *G01L 9/12* (2013.01); *G01L 9/0072* (2013.01)

(58) Field of Classification Search
CPC ... G01L 19/147; G01L 9/0042; G01L 9/0072; G01L 13/025; G01L 19/04; G01L 9/0054; G01L 9/0075; G01L 19/0038; G01L 19/0084; G01L 19/14; G01L 19/0069; G01L 19/0618; G01L 9/0055; G01L 9/0073; G01L 19/0092; G01L 19/0645;

(Continued)

(56) References Cited

U.S. PATENT DOCUMENTS 4,752,741 A * 6/1988 Kim .................... G11C 27/026
327/337
4,912,427 A * 3/1990 Rybicki .................. H03F 1/301
330/149

(Continued)

FOREIGN PATENT DOCUMENTS

EP          3029444 A1   6/2016
JP       2016109465 A    6/2016

OTHER PUBLICATIONS

European Patent Office, Extended European Search Report Issued in Application No. 17002029.1, dated May 4, 2018, Germany, 9 pages.

*Primary Examiner* — Andre J Allen
(74) *Attorney, Agent, or Firm* — Alleman Hall Creasman & Tuttle LLP

(57) ABSTRACT

In order to eliminate influence of a noise voltage applied to a diaphragm of a capacitance type sensor, the capacitance type sensor includes: a detection capacitor formed of a diaphragm and a fixed electrode, the diaphragm being connected to a frame and deformed by receiving an external force; and a fixed capacitor connected in series with the detection capacitor, so that it is intended to detect a divided voltage applied to the detection capacitor by applying a voltage to the detection capacitor and the fixed capacitor, and further includes: a noise voltage generating part connected to the frame and adapted to generate a noise voltage caused in the frame; a noise voltage adding part adapted to add the noise voltage to the voltage applied to each of the capacitors; and a noise voltage subtraction part adapted to subtract the added noise voltage from a divided voltage of the detection capacitor.

3 Claims, 3 Drawing Sheets

(58) Field of Classification Search
CPC ... G01L 19/143; G01L 9/0051; G01L 9/0052; G01L 11/025; G01L 19/0007; G01L 19/0046; G01L 19/06; G01L 19/0627; G01L 19/0681; G01L 9/00; G01L 9/0041; G01L 9/0044; G01L 11/04; G01L 19/0023; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/003; G01L 19/0609; G01L 19/0672; G01L 19/083; G01L 19/10; G01L 19/148; G01L 7/08; G01L 7/082; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/005; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

USPC .................................................. 73/700–756

See application file for complete search history.

(56) References Cited

U.S. PATENT DOCUMENTS

| | | | | |
|---|---|---|---|---|
| 6,151,967 | A * | 11/2000 | McIntosh | B81B 3/0086 361/283.4 |
| 2003/0019299 | A1* | 1/2003 | Horie | G01L 9/0073 73/718 |
| 2005/0156582 | A1* | 7/2005 | Redl | H02M 3/156 323/282 |
| 2018/0354435 | A1* | 12/2018 | Matsumoto | B60R 16/03 |

* cited by examiner

CAPACITANCE TYPE SENSOR INCLUDING DETECTION AND FIXED CAPACITORS

TECHNICAL FIELD

The present invention relates to a capacitance type sensor for measuring a physical quantity, such as a capacitance type pressure sensor.

BACKGROUND ART

As a conventional capacitance type pressure sensor, there has been known a configuration, as shown in FIG. 3. The conventional capacitance type pressure sensor includes a detection capacitor formed of a diaphragm and a fixed electrode, the diaphragm being deformed under application of a pressure, and it further includes a fixed capacitor that is connected in series with the detection capacitor. In this configuration, a rectangular wave voltage is applied to these capacitors and it is intended to detect a divided voltage applied to the detection capacitor (Patent Literature 1). By detecting the divided voltage applied to the detection capacitor in this way, the pressure applied to the diaphragm can be measured.

In specific, an output voltage obtained based on the divided voltage applied to the detection capacitor is detected by an amplifier (first-stage amplifier) and an output voltage of the first-stage amplifier is synthesized and converted to a DC voltage using an inverting/noninverting circuit (including an analog switch). Thus, it is configured to calculate the pressure based on a value of the synthesized DC voltage.

In this capacitance type pressure sensor, the diaphragm is grounded via a frame (referred to as "frame-grounded" hereinafter) and the detection circuit such as an inverting/noninverting circuit is grounded by a signal connection (referred to as "signal-grounded" hereinafter) in order to give a reference potential.

In the conventional capacitance type sensor, assuming that a frame-grounded potential (referred to as "FG potential" hereinafter) is equal to a signal-grounded potential (referred to as "SG potential" hereinafter), a divided voltage is detected based on a following expression.

$$V_{div}(ac) = V_{exc}(ac) \times Cs/(Cs+Cd)$$

Note that, a FG-SG coupling part in FIG. 3 is defined for insulating between the frame ground and the signal ground, premising that an impedance thereof is sufficiently low with respect to a frequency of the rectangular wave voltage and that an equation $V_{fg}(ac) = V_{sg}(ac)$ can be established. Here, the suffix (ac) indicates an AC voltage component of each signal when viewed from the SG potential (hereinafter, the same in the description).

However, in the case where the capacitance type sensor is used under, for example, a strong noise environment, the relationship $V_{fg}(ac) = V_{sg}(ac)$ cannot be established and this results in occurrence of a noise voltage between the frame ground and the signal ground. That is, the frame ground becomes a noise source.

Under such a condition, assuming that the AC voltage component of the FG potential when viewed from the SG potential is $V_{fg}(ac)$, there appears a term proportional to $V_{fg}(ac)$ as shown in the following expression, and this component becomes an error.

$$V_{div} = [V_{exc}(ac) \times Cs + V_{fg}(ac) \times Cd]/(Cs+Cd)$$

CITATION LIST

Patent Literature

Patent Literature 1: JP 2016-109465A

SUMMARY OF INVENTION

Technical Problem

Therefore, the present invention has been made to solve the problem mentioned above, and a main object thereof is to eliminate influence of a noise voltage applied to a capacitance type sensor.

Solution to Problem

That is, a capacitance type sensor according to the present invention includes: a detection capacitor formed of a diaphragm and a fixed electrode, the diaphragm being connected to a frame and deformed by receiving an external force; and a fixed capacitor connected in series with the detection capacitor, so that it is intended to detect a divided voltage applied to the detection capacitor by applying a voltage to the detection capacitor and the fixed capacitor. In this configuration, the capacitance type sensor further includes: a noise voltage generating part connected to the frame and adapted to generate a noise voltage caused in the frame; a noise voltage adding part adapted to add a noise voltage to the voltage applied to each of the capacitors; and a noise voltage subtraction part adapted to subtract the added noise voltage from a divided voltage (a divided voltage of the detection capacitor) obtained based on the divided voltage applied to the detection capacitor.

With this capacitance type sensor, in a configuration of detecting the divided voltage of the detection capacitor having the diaphragm connected to the frame, since the noise voltage caused in the frame is added to the voltage applied to each of the capacitors and the added noise voltage is subtracted from the divided voltage applied to the detection capacitor, the influence of the noise voltage can be eliminated.

As a specific embodiment of the noise voltage generating part, it is preferable to include: a capacitor that passes an AC voltage component of the noise voltage; and a resistor having one end connected to a subsequent stage of the capacitor and the other end grounded.

The capacitance type sensor further includes a divided voltage detection part adapted to detect a divided voltage applied to the detection capacitor. In order to precisely subtract the noise voltage included in the divided voltage detected by the divided voltage detection part, it is preferable that the divided voltage detection part includes: a capacitor that passes an AC voltage component of the divided voltage; and a resistor having one end connected to a subsequent stage of the capacitor and the other end grounded and that a time constant of the noise voltage generating part is the same as a time constant of the divided voltage detection part.

Advantageous Effects of Invention

According to the present invention, it is possible to eliminate influence of a noise voltage caused in a grounded frame to which a diaphragm of a capacitance type sensor is connected.

DESCRIPTION OF EMBODIMENTS

An embodiment of a capacitance type sensor according to the present invention will be described below with reference to the accompanying drawings.

Figure 1:
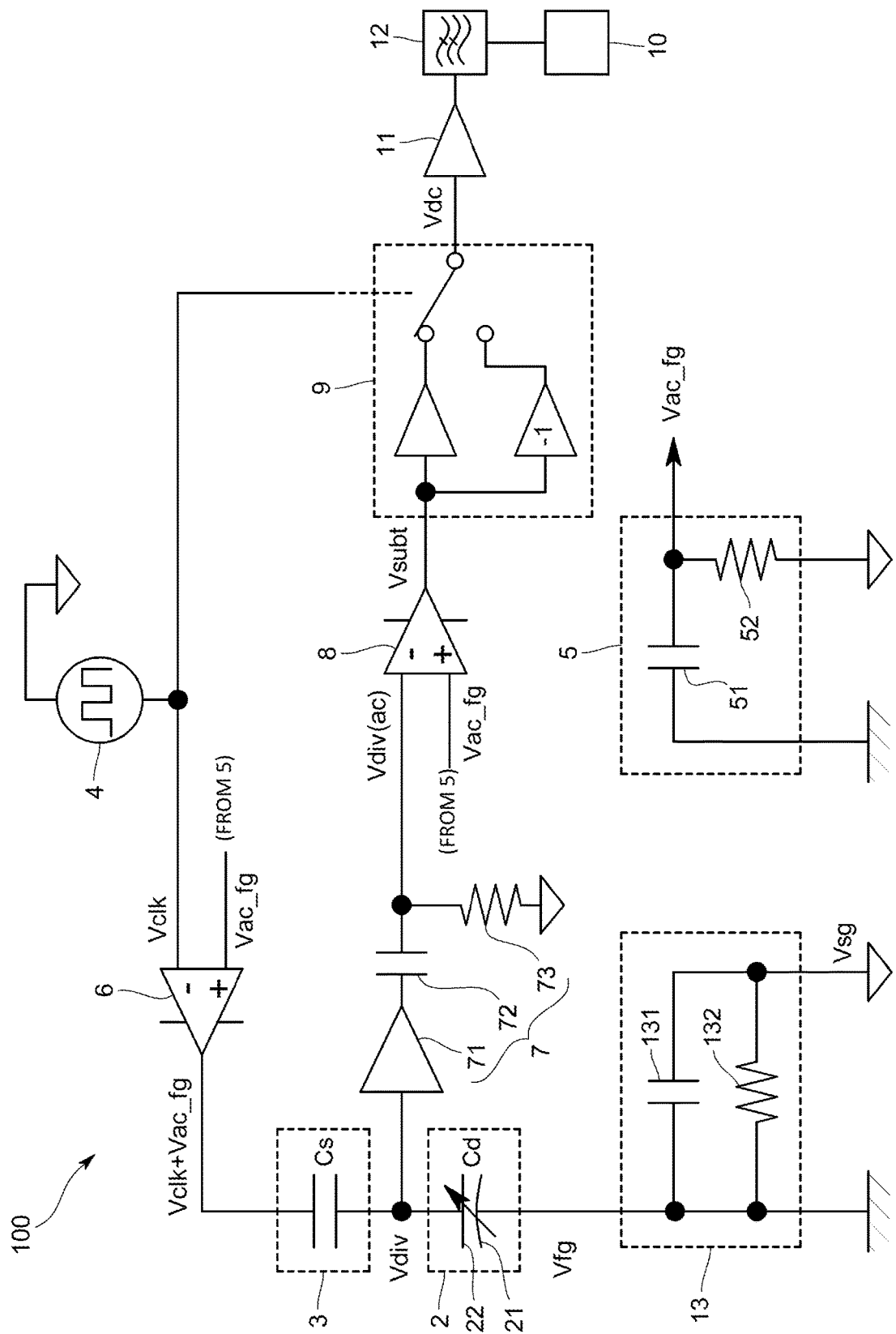
FIG. 1 is a schematic diagram showing a circuit configuration of a capacitance type pressure sensor of the present embodiment.

A capacitance type pressure sensor 100 of the present embodiment is a one-grounded type one for detecting a pressure, and as shown in FIG. 1, it includes: a detection capacitor 2 of which a capacitance is varied under application of a pressure; a fixed capacitor 3 having a reference capacitance; an initial excitation voltage generating part 4 for generating an initial excitation voltage $V_{clk}$; a noise voltage generating part 5 for generating a noise detection voltage $V_{ac-fg}$ corresponding to an AC voltage component $V_{ac-fg}$ of a noise voltage $V_{fg}$ caused in a frame ground; a noise voltage adding part 6 for adding the noise detection voltage $V_{ac-fg}$ to the initial excitation voltage $V_{clk}$; a divided voltage detection part 7 for outputting an AC voltage component $V_{div}(ac)$ of a divided voltage $V_{div}$ applied to the detection capacitor 2; a noise voltage subtraction part 8 for subtracting the noise detection voltage $V_{ac-fg}$ from the output voltage $V_{div}(ac)$ of the divided voltage detection part 7; a DC voltage converting part 9 for converting an output voltage $V_{subt}$ of the noise voltage subtraction part 8 to a DC voltage $V_{dc}$; and a pressure calculation part 10 for calculating the pressure based on a value of the converted DC voltage $V_{dc}$.

Each of the parts 2 to 10 will be described below.

The detection capacitor 2 is formed of a diaphragm 21 which is deformed by receiving a pressure and a fixed electrode 22 which is provided in a state of facing the diaphragm 21. An opposing surface of the diaphragm 21 to the fixed electrode 22 and an opposing surface of the fixed electrode 22 to the diaphragm 21 are both flat surfaces, and by deforming the diaphragm 21 upon receipt of a pressure, a distance between these opposing surfaces is varied, and therefore an electrostatic capacitance (also, briefly referred to as "capacitance" in this description) of the detection capacitor 2 is varied.

Figure 2:
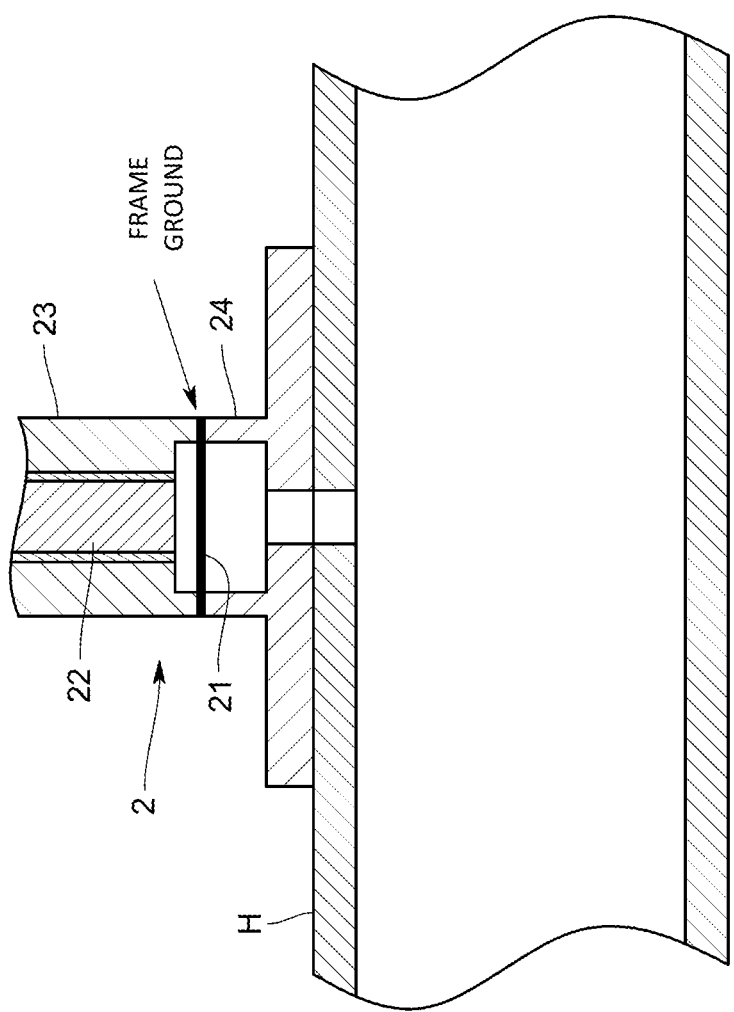
FIG. 2 is a schematic cross-sectional view mainly showing a detection capacitor of the same embodiment.
Figure 3:
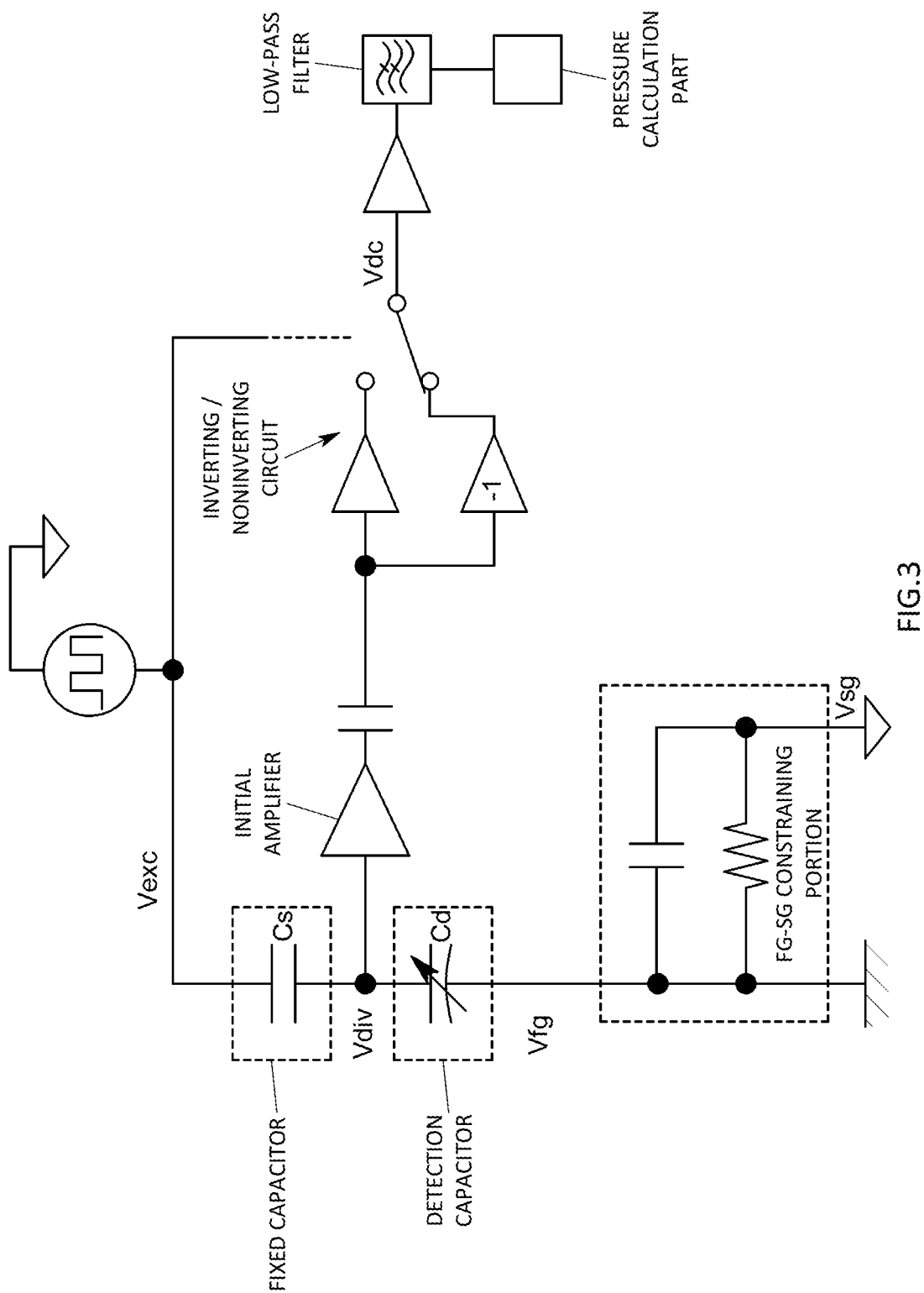
FIG. 3 is a schematic diagram showing a circuit configuration of a conventional capacitance type pressure sensor.

More specifically, as shown in FIG. 2, in the detection capacitor 2, the diaphragm 21 is joined by welding to an opening peripheral portion of a recess formed in one end of a housing 23 in which the fixed electrode 22 is fixed by sealing glass. Further, an introduction block 24 attached to a piping member H that forms a flow path of fluid, is joined by welding to a peripheral portion of a pressure receiving surface side of the diaphragm 21 welded to the housing 23, in order for introducing the fluid to the pressure receiving surface side of the diaphragm 21. In the detection capacitor 2 configured as described above, the fluid is allowed to flow into the side of the diaphragm 21 through an introduction port formed in the introduction block 24, and therefore the diaphragm 21 is displaced by the pressure of the fluid.

Further, the diaphragm 21 of the detection capacitor 2 is connected (specifically, by welding) to a frame such as the housing 23 and the introduction block 24, and therefore the diaphragm 21 is frame-grounded. Members of the frame composed of such as the housing 23 and the introduction block 24 to which the diaphragm 21 is frame-grounded are made of conductive materials such as metal. In addition, the piping member H is separately provided with ground connection (not shown). Under a strong noise environment, noises are generated in the piping member H, a cable (not shown) connecting the piping member H and the ground, the frame, and the like, and this results in that a noise voltage is inputted to the detection capacitor 2 from the frame-ground.

Moreover, between the diaphragm 21 and the frame ground, there is provided an insulating part 13 composed of an insulating capacitor 131 for insulating the frame ground and a signal ground and a resistor 132 connected in parallel to the insulating capacitor 131. Here, the signal ground is a ground configuration for providing a reference potential of a detection circuit part such as the DC voltage converting part 9.

The fixed capacitor 3 has a fixed capacitance which is not varied irrespective of the pressure applied to the detection capacitor 2. The fixed capacitor 3 is connected in series to the side of the fixed electrode 22 of the detection capacitor 2. Note that, the capacitance of the fixed capacitor 3 may be adjustable except a measurement operation of a pressure so long as the capacitance thereof is fixed during a measurement operation of the pressure.

The initial excitation voltage generating part 4 generates an initial voltage $V_{clk}$ having a rectangular waveform of a predetermined frequency applied to the detection capacitor 2 and the fixed capacitor 3, and it includes: a reference voltage generating part such as a reference IC for generating a constant DC voltage (e.g., DC voltage of 2.5 V); and a converting part for converting the constant DC voltage to the initial excitation voltage $V_{clk}$ of the predetermined frequency (e.g., 25 kHz) by a predetermined PWM signal inputted from the outside.

The noise voltage generating part 5 is connected to have the frame ground which is a noise source, and it is adapted to detect an AC voltage component $V_{fg}(ac)$ of a noise voltage $V_{fg}$ caused in the frame ground and generate a noise detection voltage $V_{ac-fg}$ corresponding to the AC voltage component $V_{fg}(ac)$, that is, $V_{fg}(ac)=V_{dc-fg}$.

In specific, the noise voltage generating part 5 is a high-pass filter and includes: a capacitor 51 (capacitance C1) for passing an AC voltage component; and a resistor 52 (resistance value R1) with its one end connected to a subsequent stage of the capacitor 51 and the other end grounded.

The noise voltage adding part 6 is specifically configured of a differential amplifier and it is adapted to add the noise detection voltage $V_{ac-fg}$ generated by the noise voltage generating part 5 and the initial voltage $V_{clk}$ (generated by the initial excitation voltage generating part 4. More specifically, the initial excitation voltage $V_{clk}$ generated by the initial excitation voltage generating part 4 is inputted to a negative input terminal of the differential amplifier and the noise detection voltage $V_{ac-fg}$ generated by the noise voltage generating part 5 is inputted to a positive input terminal thereof. Thus, the differential amplifier outputs a voltage $(V_{clk}+V_{ac-fg})$ to be applied to the capacitors 2 and 3 from an output terminal thereof, and this outputted application voltage $(V_{clk}+V_{ac-fg})$ is first applied to one terminal of the fixed capacitor 3.

The divided voltage detection part 7 is adapted to output the divided voltage $V_{div}$ that is applied to the detection capacitor 2 in the case where the application voltage $(V_{clk}+V_{ac-fg})$ is applied to the capacitors 2 and 3. In specific, the divided voltage detection part 7 includes: an operational amplifier 71 functioning as a buffer amplifier; a capacitor 72

(capacitance C2) which is provided at an output side of the operational amplifier 71 and passes the AC voltage component $V_{div}$(ac) of the divided voltage $V_{div}$; and a resistor 73 (resistance value R2) with its one end connected to a subsequent stage of the capacitor 72 and the other end grounded. In the present embodiment, it is configured that a time constant (C1×R1) of the noise voltage generating part 5 is equal to a time constant (C2×R2) of the divided voltage detection part 7. Note that the resistance value R2 of the resistor 73 of the divided voltage detection part 7 is set so that a half of a peak value of the AC voltage component $V_{div}$(ac) corresponds to an amplitude center.

Here, the AC voltage component $V_{div}$(ac) outputted from the divided voltage detection part 7 is expressed by a following expression:

$$V_{div}(ac) = \{[V_{clk}(ac) + V_{ac-fg}] \times Cs + V_{fg}(ac) \times Cd\}/(Cs+Cd)$$

where Cs is a capacitance of the fixed capacitor 3, and Cd is a capacitance of the detection capacitor 2.

In this expression, since $V_{ac-fg} = V_{fg}$ (ac), $$V_{div}(ac) = [V_{clk}(ac) \times Cs]/(Cs+Cd) + V_{ac-fg}$$

The noise voltage subtraction part 8 is specifically configured of a differential amplifier and it is adapted to subtract the noise detection voltage $V_{ac-fg}$ contained in the AC voltage component $V_{div}$(ac) from the AC voltage component $V_{div}$(ac) outputted from the divided voltage detection part 7. More specifically, the AC voltage component $V_{div}$(ac) outputted from the divided voltage detection part 7 is inputted to a negative input terminal of the differential amplifier and the noise detection voltage $V_{ac-fg}$ detected by the noise voltage generating part 5 is inputted to a positive input terminal thereof.

Here, the AC voltage component $V_{subt}$(ac) obtained by the subtraction of noise detection voltage $V_{ac-fg}$ outputted from the noise voltage subtraction part 8 is expressed by a following expression:

$$V_{subt}(ac) = [V_{clk}(ac) \times Cs]/(Cs+Cd)$$

Therefore, in either case whether the noise voltage $V_{fg}$(ac) is superimposed or not, the AC voltage component $V_{subt}$(ac) having eliminated the influence of the noise voltage $V_{fg}$(ac) is outputted from the noise voltage subtraction part 8 and applied to the DC voltage converting part 9.

The DC voltage converting part 9 is adapted to convert the AC voltage component $V_{subt}$(ac) outputted from the noise voltage subtraction part 8 to a DC voltage $V_{dc}$ using an inverting/noninverting circuit. A switch for switching between inversion and non-inversion acquires the PWM signal from the initial excitation voltage generating part 4 and switches the inversion and non-inversion in accordance with the predetermined frequency of the PWM signal.

The pressure calculation part 10 acquires the DC voltage $V_{dc}$ outputted from the DC voltage converting part 9 and calculates the pressure based on the DC voltage $V_{dc}$. In specific, the pressure calculation part 10 has voltage/pressure relation data or calibration curve data indicating the relationship of voltage/pressure, and calculates the pressure based on the voltage/pressure relation data or calibration curve data. In the present embodiment, an amplifier 11 and a low-pass filter 12 are provided in a precedent stage of the pressure calculation part 10.

According to the capacitance type pressure sensor 100 configured as described above, since the noise voltage $V_{fg}$(ac) caused in the frame ground is added to the voltage $V_{clk}$(ac) applied to the capacitors 2 and 3 and the added noise voltage $V_{fg}$(ac) is subtracted from the divided voltage $V_{div}$ (ac) of the detection capacitor 2, the influence of the noise voltage $V_{fg}$(ac) can be eliminated.

In addition, since the noise voltage generating part 5 uses the high-pass filter, the noise voltage $V_{fg}$(ac) affecting the detection capacitor 2 can be accurately reproduced.

Further, since the time constant (C1×R1) of the high-pass filter as the noise voltage generating part 5 is made equal to the time constant (C2×R2) of the divided voltage detection part 7, the noise voltage $V_{fg}$(ac) contained in the divided voltage $V_{div}$(ac) detected by the divided voltage detection part 7 can be accurately subtracted.

Note that the present invention should not be limited to the above embodiment.

For example, although the sensor of the above embodiment is a type of detecting a pressure, it may be also a type of detecting acceleration.

Furthermore, according to the capacitance type sensor of the present invention, by detecting a change in capacitance due to filling a space between the diaphragm and the fixed electrode of the detection capacitor with a measurement target substance, it is also possible to detect humidity of the measurement target substance, concentration and dielectric constant and the like of a predetermined component contained in the measurement target substance.

In addition, in the above embodiment, although the noise detection voltage $V_{ac-fg}$ detected by the noise voltage generating part 5 is commonly applied to the noise voltage adding part 6 and the noise voltage subtraction part 8, the noise voltage generating part (high-pass filter) may be individually provided for each of the noise voltage adding part 6 and the noise voltage subtraction part 8. In this case, the time constant of the noise voltage generating part connected to the noise voltage adding part 6 is set to be larger than that of the noise voltage generating part connected to the noise voltage subtraction part 8. Thus, low-frequency noise components can be also added, and the reproducibility of the noise voltage can be improved.

In the above embodiment, although it is configured that the noise detection voltage generated by the noise voltage generating part is inputted to the noise voltage adding part 6 and the noise voltage subtraction part 8, it may be also possible to perform a process such as changing an amplitude of the noise voltage generated by the noise voltage generating part and input the processed noise voltage to the noise voltage adding part 6 and the noise voltage subtraction part 8.

In the above embodiment, although the noise detection voltage is the AC voltage component of the noise voltage, it may also include the DC voltage component of the noise voltage.

In addition, it is needless to say that the present invention is not limited to each of the embodiments mentioned above, and various modifications thereof can be made in a range without departing from the spirit thereof.

LIST OF REFERENCE CHARACTERS

100 . . . Capacitance type pressure sensor
2 . . . Detection capacitor
21 . . . Diaphragm
22 . . . Fixed electrode
3 . . . Fixed capacitor
4 . . . Initial voltage generating part
5 . . . Noise voltage generating part
51 . . . Capacitor
52 . . . Resistor
6 . . . Noise voltage adding part 7 ... Divided voltage detection part
72 ... Capacitor
73 ... Resistor
8 ... Noise voltage subtraction part
9 ... DC voltage converting part
10 ... Pressure calculation part

The invention claimed is:

1. A capacitance type sensor that comprises: a detection capacitor formed of a diaphragm and a fixed electrode, the diaphragm being connected to a frame and deformed by receiving an external force; and a fixed capacitor connected in series with the detection capacitor, so that it is intended to detect a divided voltage applied to the detection capacitor by applying a voltage to the detection capacitor and the fixed capacitor, the capacitance type sensor comprising:

a noise voltage generating part connected to the frame and adapted to generate a noise voltage caused in the frame;

a noise voltage adding part adapted to add the noise voltage to the voltage applied to the detection capacitor and the fixed capacitor; and a noise voltage subtraction part adapted to subtract the added noise voltage from a divided voltage obtained based on the divided voltage applied to the detection capacitor.

2. The capacitance type sensor according to claim 1, wherein the noise voltage generating part comprises: a first capacitor that passes an AC voltage component of the noise voltage; and a first resistor having a first end connected to a subsequent stage of the first capacitor and a second end grounded.

3. The capacitance type sensor according to claim 2, further comprising a divided voltage detection part adapted to detect the divided voltage applied to the detection capacitor, wherein the divided voltage detection part comprises: a second capacitor that passes an AC voltage component of the divided voltage; and a second resistor having a first end connected to a subsequent stage of the second capacitor and a second end grounded, and wherein a time constant of the noise voltage generating part is the same as a time constant of the divided voltage detection part.

* * * * *